United States Patent [19]

Blume, Jr. et al.

[11] 4,153,933
[45] May 8, 1979

[54] SINGLE CHIP MOS COMPUTER WITH EXPANDABLE MEMORY

[75] Inventors: Henry M. Blume, Jr., Portola Valley; David A. Stamm, Santa Clara; David L. Budde, San Jose, all of Calif.

[73] Assignee: Intel Corporation, Santa Clara, Calif.

[21] Appl. No.: 877,108

[22] Filed: Feb. 13, 1978

Related U.S. Application Data

[63] Continuation of Ser. No. 636,535, Dec. 1, 1975, abandoned.

[51] Int. Cl.² .......................... G06F 13/00; G06F 7/48
[52] U.S. Cl. .................................................. 364/200
[58] Field of Search ... 364/200 MS File, 900 MS File, 364/712

[56] References Cited

U.S. PATENT DOCUMENTS

| 3,292,151 | 12/1966 | Barnes et al. | 364/200 |
|---|---|---|---|
| 3,387,283 | 6/1968 | Snedaker | 364/200 |
| 3,462,742 | 8/1969 | Miller et al. | 364/200 |
| 3,702,988 | 11/1972 | Haney et al. | 364/200 |
| 3,748,452 | 7/1973 | Ruben | 364/200 |
| 3,757,308 | 9/1973 | Fosdick | 364/200 |
| 3,793,631 | 2/1974 | Silverstein et al. | 364/200 |
| 3,800,129 | 3/1974 | Umstattd | 364/712 X |
| 3,821,715 | 6/1974 | Hoff, Jr. et al. | 364/200 |
| 3,878,514 | 4/1975 | Faber | 364/200 |
| 3,892,957 | 7/1975 | Bryant | 364/200 |
| 3,934,229 | 1/1976 | Cochran et al. | 364/900 |
| 3,939,452 | 2/1976 | Faggian | 364/200 |
| 3,943,494 | 3/1976 | Holmes, Jr. et al. | 364/200 |
| 3,944,983 | 3/1976 | Gale | 364/900 |
| 3,962,682 | 6/1976 | Bennett | 364/200 |
| 3,962,683 | 6/1976 | Brown et al. | 364/200 |
| 3,972,025 | 7/1976 | Taddei | 364/200 |
| 3,975,714 | 8/1976 | Weber et al. | 364/200 |
| 3,984,670 | 10/1976 | Erickson | 364/200 |
| 3,984,813 | 10/1976 | Chung | 364/200 |
| 4,016,545 | 4/1977 | Lipovski | 364/200 |
| 4,025,903 | 5/1977 | Kaufman et al. | 364/200 |

OTHER PUBLICATIONS

Altman, "Single Chip Microprocessors Open up a New World of Applications" in *Electronics,* Apr. 18, 1974, pp. 81-87.

Reyling, Jr., "Single Chip Microprocessor Employs Minicomputer Word Length" in *Electronics,* Dec. 26, 1974, pp. 87-93.

*Primary Examiner*—Melvin B. Chapnick
*Attorney, Agent, or Firm*—Blakely, Sokoloff, Taylor & Zafman

[57] ABSTRACT

An MOS digital computer incorporated on a single chip (monolithic structure) which includes a central processing unit (CPU), random-access memory (RAM), and a programmable read-only memory (PROM). A program counter is used to fetch instructions stored in the erasable PROM, and may also be used to fetch instructions from an external memory. The PROM may also be externally addressed for testing, or may be electrically isolated from the remainder of the computer to permit execution of external instructions for testing the CPU and RAM.

13 Claims, 7 Drawing Figures

SINGLE CHIP MOS COMPUTER WITH EXPANDABLE MEMORY

This is a continuation of application Ser. No. 636,535, filed Dec. 1, 1975, now abandoned.

BACKGROUND OF THE INVENTION

1. Field of the Invention

The invention relates to the field of MOS computers.

2. Prior Art

MOS and bipolar multi-chip digital computers are known in the art. For example, a multi-chip bipolar microprocessor and a single chip MOS processor are commercially available. However, several other chips are required to fabricate a complete MOS computer from a single chip MOS processor. Typically, a separate chip or chips are required for program storage, "scratchpad" memory or other functions. By reducing the number of chips required to fabricate a computer, cost is reduced, compatibility problems are lessened, and cycle times are readily increased.

For many less sophisticated digital computer applications such as for automobiles, appliances, and countless other applications, a multi-chip computer is both too costly and overly complicated. Ideally, for many such applications, a single chip digital computer which includes program storage is needed.

Several problems result with the fabrication of an entire computer on a single chip or substrate. In prior art computers, for example, the program memory may be readily separated from the CPU, allowing independent testing of the CPU and program memory. However, when both the CPU and program memory are on the same chip, independent testing of the program memory and CPU becomes difficult. Other problems occur where an erasable PROM is employed in a single chip computer. Such PROM's require substantially higher programming voltages than are used during computer operation and such programming potentials may cause damage to parts of the computer.

Also to realize a single chip MOS computer, the "scratchpad" registers must be used to their maximum efficiency, since such registers require a considerable amount of chip area when compared to the other computer circuits.

As will be seen, the present invention provides an entire MOS computer including an erasable PROM on a single MOS chip. A RAM, which is used in a highly efficient manner, provides "scratchpad" storage.

SUMMARY OF THE INVENTION

An MOS digital computer which is entirely included on a single substrate is disclosed. The computer includes a bidirectional data bus having a terminal for coupling to external circuit means. A central processing unit (CPU) for performing arithmetic functions and for controlling the general operation of the computer is connected to the data bus. A random-access memory (RAM) which is also coupled to the data bus is used for data storage within the computer. Bytes of program are stored in a read-only memory (ROM) which memory is coupled to the CPU and to the data bus. The CPU includes a program counter means coupled to the ROM and data bus. This counter means provides address signals to a terminal on the substrate adaptable to be coupled to external memory when the count in the program counter means exceeds a predetermined count. In this manner, the program storage capacity of the computer may be expanded by use of the external memory which is automatically addressed by the computer's program counter means.

DETAILED DESCRIPTION OF THE INVENTION

Figure 1:
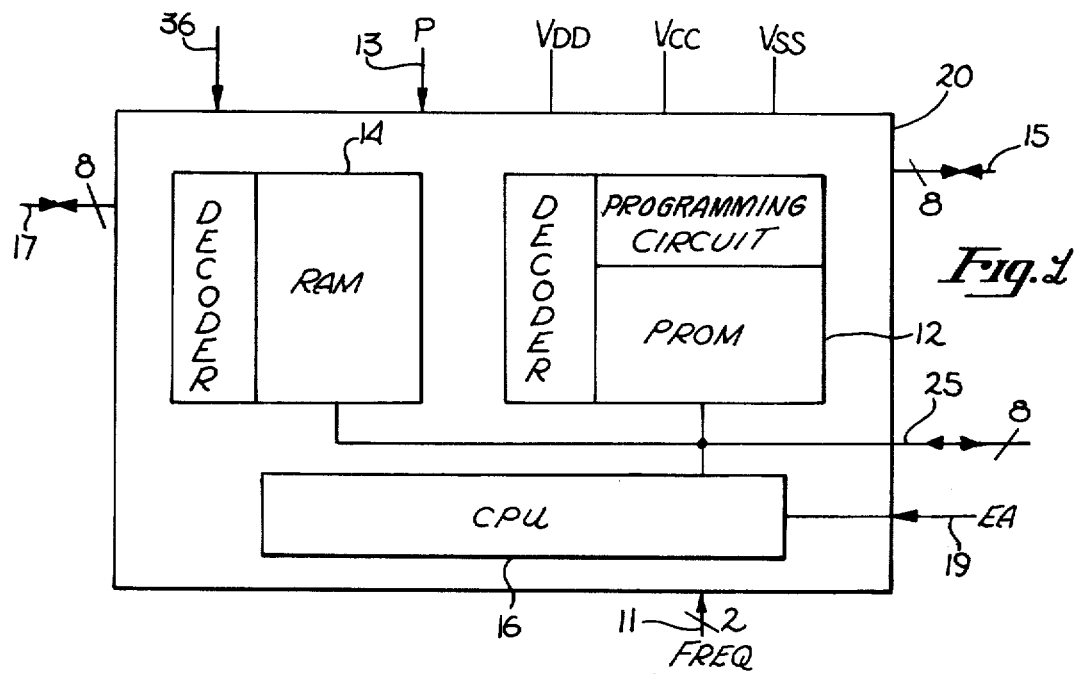
FIG. 1 is an overall block diagram of the computer illustrating its three primary sections, a CPU, RAM and PROM.

An integrated circuit, metal-oxide-semiconductor (MOS) digital computer entirely included on a single silicon substrate is disclosed. The computer includes a central processing unit (CPU), a random-access memory (RAM), and a programmable read-only memory (PROM) for storing computer instructions. Referring to FIG. 1, the computer is shown on substrate 20 as including PROM 12, RAM 14, and CPU 16, which are interconnected by a main, bidirectional data bus 25. This eight-line data bus, in addition to communicating with the eight-bit CPU 16, RAM 14 and PROM 12, communicates with external circuits through a plurality of input/output ports. In its presently preferred embodiment the computer is realized in n-channel MOS devices employing polycrystalline silicon gates. Only a single power supply (five volts) is required for computer operations, other than programming. The computer is adaptable for processing over seventy instructions, most of which are single cycle instructions with an instruction execution time of two to six microseconds.

In this disclosure many specific details concerning the computer have not been included since they are known in the art, would complicate the disclosure, and would obscure the novel points of the computer. It will also be appreciated however, that many of the specific details that are included, are included to explain the novel features of the computer, and are not specifically necessary to practice the disclosed inventive concepts.

In FIG. 1 some of the input and output lines of the computer are illustrated such as the ground line $V_{SS}$. The computer utilizes during normal (non-programming) operation, a single (positive) five volt power source which is identified as $V_{CC}$. While the computer is operating this five volt potential is also applied to the line identified as $V_{DD}$; however, during the programming of the PROM 12, a potential of twenty-five volts is applied to the $V_{DD}$ line.

The computer as shown in FIG. 1 includes three, eight-bit data buses: the main bidirectional data bus 25, and two additional "quasi" bidirection data buses 15 and 17. The buffer amplifiers employed on each line of buses 15 and 17 shall be discussed in detail in conjunction with FIG. 5. The eight lines of the main data bus 25 may be synchronously used for writing information into the computer, or for reading information from the computer. Strobe lines, not illustrated, are used for this purpose.

Other lines coupled to the computer as shown in FIG. 1 include a line 13 which receives a programming pulse of approximately twenty-five volts for programming PROM 12. A timing signal is applied to line 36 for latching an external address into the program counter, as will be described in conjunction with FIG. 2. A pair of lines 11 are utilized for applying a timing signal to the computer. This timing signal may be a crystal generated signal, or may be generated by an RC oscillator, or the like. The computer includes, however, its own oscillator and clocking circuits, thus requiring the external frequency source only synchronization. As presently implemented, an instruction cycle consists of five states, each state requiring three oscillator periods. Therefore, for a 5.0 microsecond instruction cycle, a 3mHz input signal to lines 11 is used. An "EA" signal is applied to the computer on line 19. This signal shall be discussed in more detail in conjunction with FIG. 2. Other inputs and outputs to the computer not illustrated in FIG. 1 includes a power-on-clear line, synchronization output line, and other lines.

The CPU 16 of FIG. 1 performs standard arithmetic operations and control functions for the computer. Thus, known circuits may be employed in this unit. This unit includes an arithmetic logic unit (ALU) for adding, exclusive ORing, logic AND and OR operations and for shifting. The CPU also includes an twelve-bit program counter, the operation and function of which will be discussed in more detail in conjunction with FIG. 2. Other known circuit means are included with the CPU such as an instruction decoder, port control means, stack pointer register, and a RAM address register and related logic means which shall be described in more detail in conjunction with FIG. 3.

In the presently preferred embodiment, RAM 14 comprises a static MOS RAM used for internal data storage; the capacity of this RAM is sixty-four, eight-bit words arranged in a 16 × 32 array. For purposes of discussion, the RAM 14 shall be described as sixty-four, eight-bit registers $R_0$ through $R_{63}$. Eight such registers ($R_0$–$R_7$) are directly addressable, all registers are indirectly addressable from registers $R_0$ and $R_1$.

Registers $R_8$ through $R_{23}$ may be used for address stack storage for enabling the CPU to keep track of return addresses generated from call instructions and interrupts. A three-bit stack pointer register 72 (FIG. 3) supplies the address of the locations into which the next return address is to be loaded. This "push-down" stack pointer register is incremented by a binary one after a return address is stored, and decremented by binary one before an address is fetched. A total of eight levels of nesting is possible with the stack pointer register as presently employed. (It should be noted that since twelve-bits are required to address the PROM, two registers within RAM 14 must be used to store a single PROM address). Thus, when the stack pointer is incremented or decremented by one, the actual address to which the stack pointer points is moved by two. In cases where the eight levels of nesting are not required, the unused registers ($R_8$–$R_{23}$) may be employed for other purposes as will be disclosed.

Figure 3:
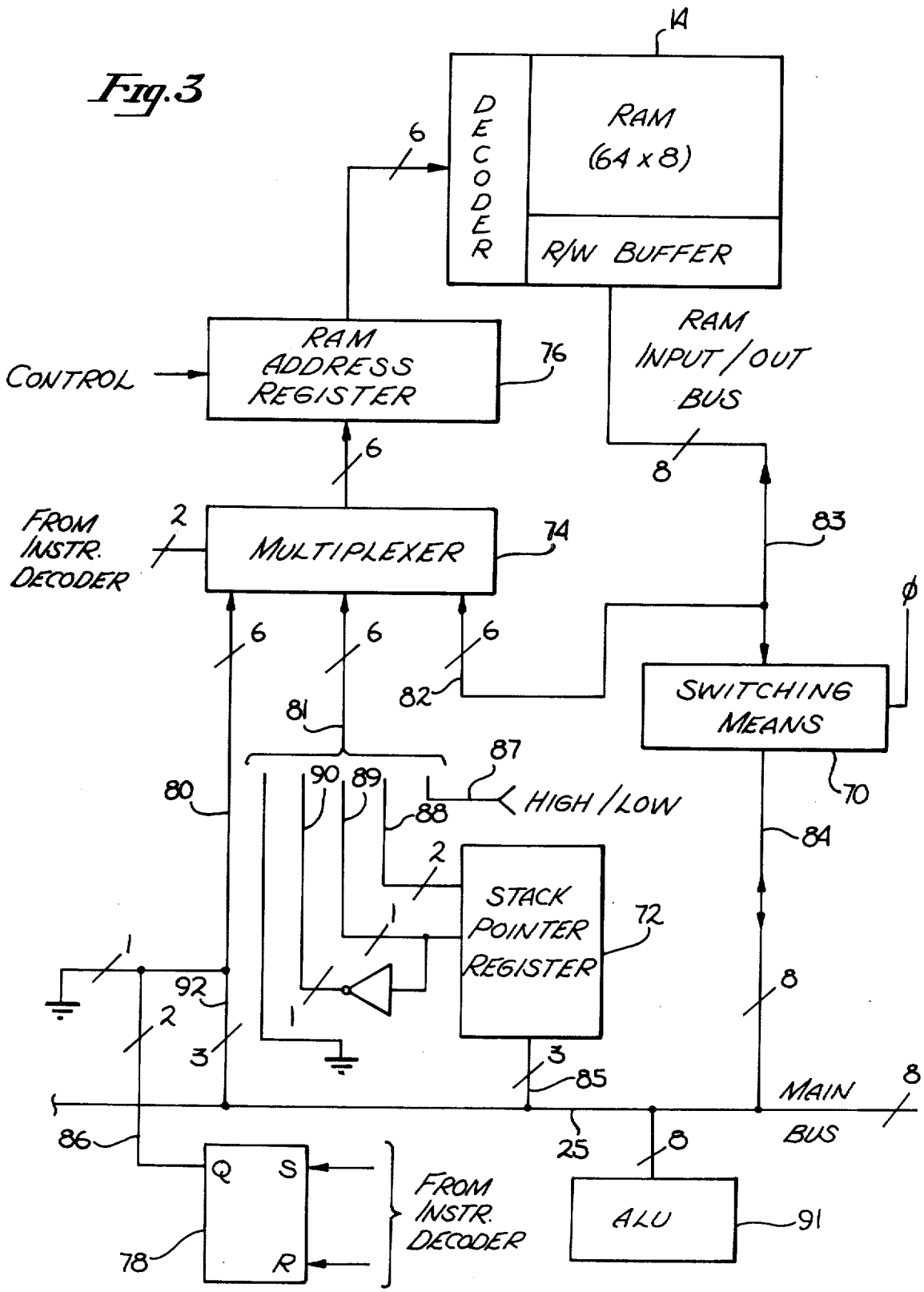
FIG. 3 is a block diagram of the RAM address logic means and circuits, this diagram illustrates the manner in which RAM addresses are selected.

Registers $R_{24}$ through $R_{31}$ of the RAM 14 are directly addressable in a manner similar to registers $R_0$ through $R_7$ in a bank switching system which shall be described in detail in conjunction with FIG. 3. Registers $R_{32}$ through $R_{63}$ are used for any required computer storage.

The PROM 12 is used for storing 1,024 eight-bit instructions (that is, bytes of program storage which includes instructions and constants, hereinafter collectively referred to as instructions) and comprises a 128 × 64 array. In the presently preferred embodiment, each storage element or cell of the array includes an MOS device having a floating gate which is completely surrounded by oxide. Information is stored in each of these devices in the form of electrical charge which is injected into the floating gate by avalanche injection. The entire PROM 12 may be erased by subjecting the substrate 20 to ultra-violet radiation, thereby discharging the floating gates. Such erasable floating gate devices are known in the prior art, for example, see U.S. Pat. No. 3,797,000. As presently fabricated double polycrystalline silicon technology is employed in the PROM 12. The specific process used for fabricating PROM 12 is disclosed in copending application Ser. No. 626,859, filed Oct. 29, 1975, assigned to the assignee of this application. The self aligned, double polycrystalline MOS process disclosed in this copending, application permits the use of a single operating potential (five volts), and also reduces the area of each cell when compared to prior art floating gate devices.

While in the presently preferred embodiment a PROM is employed, a read-only-memory (ROM) may be used, particularly after a computer program has been developed. A ROM may be fabricated on the chip in place of the PROM 12 with known technology.

Figure 2:
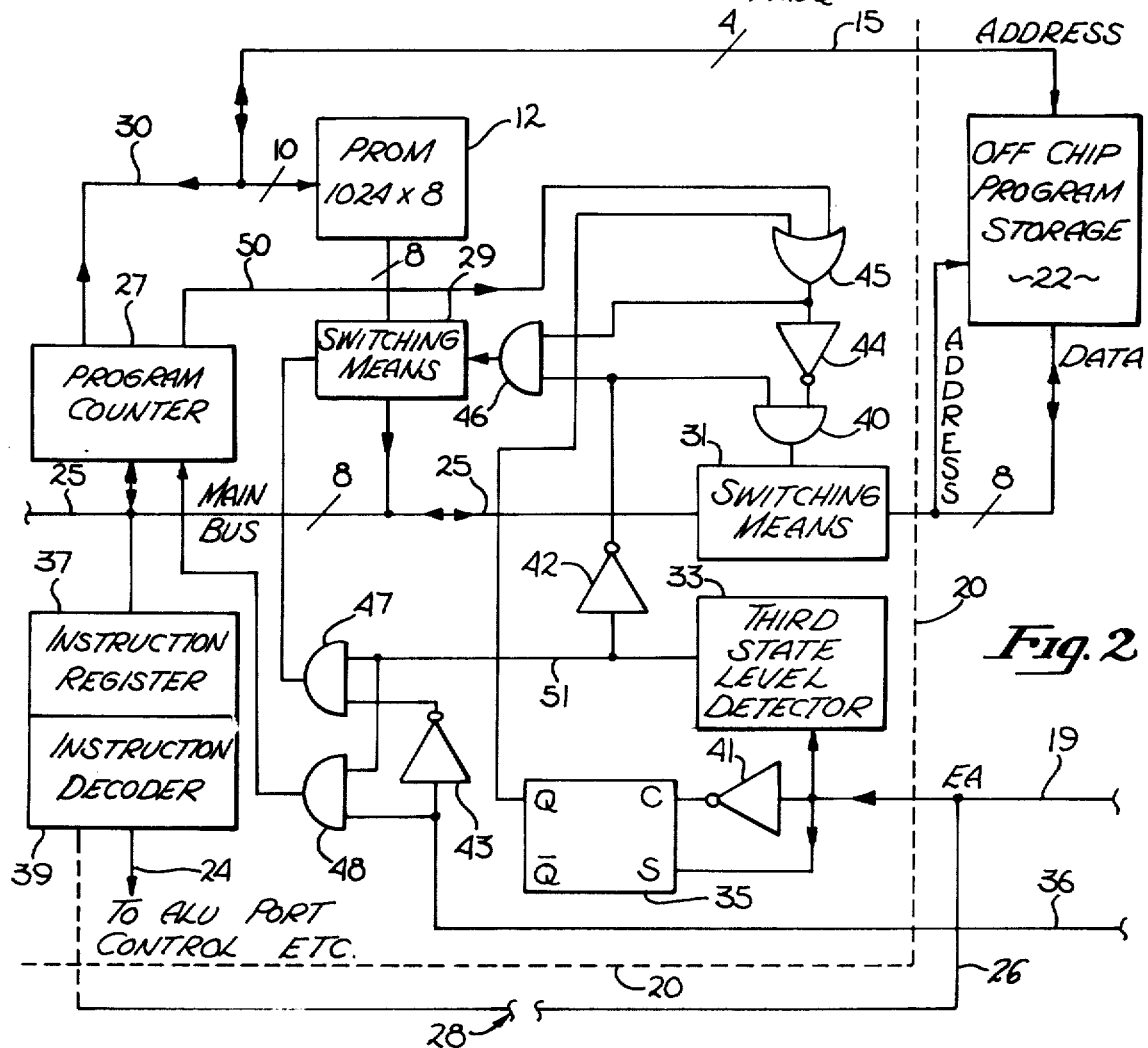
FIG. 2 is a detailed block diagram of the logic circuits associated with the program counter which circuits are employed for testing the PROM, and RAM and CPU, and for addressing external memory means.

Referring to FIG. 2 the PROM 12 of FIG. 1, along with the main bidirectional data bus 25 are illustrated on the substrate 20. A program counter 27 which in the presently preferred embodiment comprises an twelve-bit counter, communicates an address to the decoder portion of PROM 12 on bus 30. The two most significant bits of the counter 27 are coupled to one input terminal of OR gate 45 on line 50. The program counter 27 is also coupled to the bus 25, and is able to receive an address signal from bus 25, and also to transmit an eight-bit signal on bus 25 to an off-chip program storage means 22. As will be explained, in greater detail, when an instruction is fetched off-chip, eight-bits of the address are transmitted via bus 25, while the four remaining bits from the program counter 27 are transmitted on four lines of the eight-line bus 15 to the off-chip program storage means 22.

The PROM 12 as shown in FIG. 2 is coupled to the bidirectional data bus 25 via a switching means 29 which means, as will be explained, is used to interrupt the flow of information from the PROM 12 to the bus 25. Another switching means 31 which is coupled along bus 25, selectively couples bus 25 to output ports, thus bus 25 may communicate with external circuits such as memory 22. Switching means 29 and 31 are normally closed, and are controlled by the outputs of AND gates 46 and 47, and AND gate 40, respectively.

The "EA" (external address) line 19 is coupled to the input terminal of a third state level detector 33, to an inverter 41, and to the "set" terminal of a flip-flop 35. The output of the inverter 41 is coupled to the "clear" terminal of the flip-flop 35. The "Q" terminal of the flip-flop 35 is coupled to one input terminal of OR gate 45. The output of the third state level detector 33 (line 51) is coupled to an input terminal of AND gates 47 and 48, and to the input terminal of inverter 42. The output of inverter 42 is coupled to an input terminal of AND gates 40 and 46. The output of OR gate 45 is coupled to the other terminal of AND gate 46, and to an inverter 44. The output of inverter 44 is coupled to the other input terminal of AND gate 40.

Figure 4:
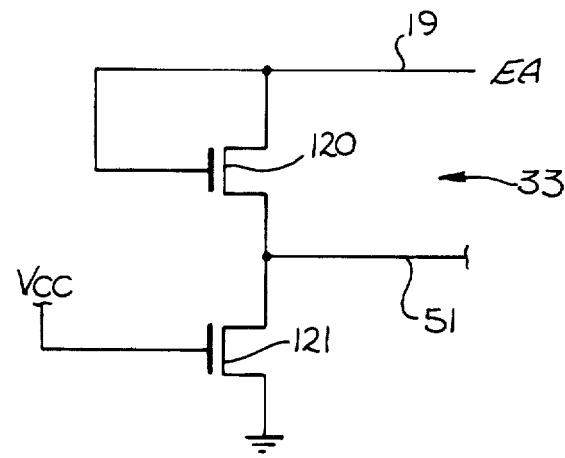
FIG. 4 is a circuit diagram of the third state level detector employed within the computer.

The third state level detector 33 which is shown in FIG. 4, detects the voltage level on line 19 and provides an output signal on line 51 when the input signal is a third state signal (25 volts). Substantially no output is produced by detector 33 when the signal on line 19 is 0 volts (EA=0), or 5 volts (EA=1).

An instruction register 37 is coupled to the main bus 25. This instruction register, in turn, is coupled to an instruction decoder 39 which is used to decode instructions from PROM 12, or instructions applied to bus 25 from an external source. The instruction decoder 39 is coupled by a plurality of lines 24 to numerous circuits in the CPU 16, including the ALU, port control means, carry logic means, etc. The output of the instruction decoder 39 is shown in FIG. 2 coupled to the input line 19, via a line 26. The line 26 includes a break 28 to indicate that line 26 need not directly couple line 24 to the input line 19, but rather coupling may occur through intermediate circuits. As will be discussed in greater detail, the decoder 39 may provide a signal to line 19, which signal will cause instructions to be fetched from off-chip memory, such as from the program storage means 22.

The timing signal applied to line 36 is used to load an externally applied address into the program counter 27, for testing the contents of the PROM 12. Line 36 is coupled to the other input terminal of AND gate 48 and to the other input terminal of AND gate 47 through an inverter 43. The output of the AND gate 48 is coupled to the program counter 27, and provides a signal which indicates that the program counter is to load an address (eight-bits from line 25 and four-bits from line 30). The output of the AND gate 47 is coupled to the switching means 29, and provides a signal to prevent information from the PROM from being coupled to bus 25 while the program counter 27 is being loaded with the externally provided address.

The various circuit elements shown in FIG. 2 such as the AND gates, OR gates, inverters, flip-flop, switching means and registers may be ordinary circuit means incorporating known designs. As will be appreciated, the circuit of FIG. 2 has been simplified, other signal paths and logic means have been eliminated in order that the novel aspects of the computer may readily be understood. However, those portions of the circuit not shown in FIG. 2 are well known in the art.

Assume that the PROM 12 has been programmed, the computer is in operation, EA=0, and the count in counter 27 is equal to, or less than, 1024. With no signal on line 19, the flip-flop 35 is set such that the Q output of flip-flop 35 is low, and hence no signal is applied to one input terminal of OR gate 45. Since the count in counter 27 is less than 1025, no signal is applied to the other input terminal of OR gate 45, thus no output is present at the output of this gate. This will cause switching means 29 to remain closed, thereby coupling PROM 12 to bus 25. Also, the outputs of inverters 42 and 44 will be high, thereby providing an output at gate 40. This opens switching means 31, preventing bus 25 from receiving external signals. Thus, with the count in program counter 27 at 1,024 or less, and with EA=0, the program counter 27 fetches instruction from PROM 12.

When the count in the program counter 27 exceeds 1,024 a signal is transmitted from counter 27, on line 50, to the OR gate 45. This signal causes an output at gate 45, this output along with the signal from inverter 42 opens switch 29 through AND gate 46. The output signal at gate 45, after being inverted by inverter 44, removes one input signal to gate 40. This causes switching means 31 to couple the bus 25 to the output ports of the computer. Thus, the program counter 27 fetches instructions from an off-chip storage means 22, automatically, when the count in the counter 27 exceeds 1024. When the signal on line 50 is removed (a count less than 1025 in the counter), the PROM 12 is again coupled to the bus 25, and the switching means 31 prevents the bus 25 from communicating with the external program storage means 22.

Assume that EA=1; this causes the flip-flop 35 to change state. Flip-flop 35 then applies a signal to OR gate 45, causing an output at gate 45. The signal level of five volts (EA=1) on line 19 is not sufficient to cause an output from the third state level detector 33, thus the signal at the output of inverter 42 remains high. Under these conditions an output signal is generated by the AND gate 46 which opens switching means 29, independently of the status of the program counter 27. The output from OR gate 45, after being inverted by inverter 44, prevents any output from AND gate 40. This causes switching means 31 to couple the bus 25 to the output ports of the computer. Thus, externally generated instructions may be applied to the computer, and the response of the computer to these instructions may be examined on bus 25, or on other lines such as the buses 15 and 17 of FIG. 1. In this manner, CPU 16 and RAM 14 of FIG. 1 may be tested separately, and apart, from the PROM 12. The signal applied to line 19 may be initiated within the computer, as indicated by line 26. In this mode of operation, externally stored instructions may be fetched by counter 27, or externally applied independently of counter 27.

Assume that a signal in excess of five volts (twenty-five volts for the presently preferred embodiment) is applied to line 19. When this occurs, the third state level detector 33 detects this signal, and generates an output signal on line 51. This output signal, through inverter 42, prevents the generation of a signal at the output of the AND gate 46; this prevents switching means 29 from being opened by gate 46. Also, this output signal from detector 33, in a similar manner, prevents switching means 31 from being opened by gate 40. If no signal is present on line 36, an output signal will be present at the output of AND gate 47 which signal will decouple the PROM 12 from bus 25 through switching means 29. Under these conditions an external address may be applied to the program counter 27 on bus 25 and bus 30 (via bus 15). When a signal is applied to line 36, an output is generated by AND gate 48 which output causes the address to be loaded into the counter 27. Simultaneously, the presence of a signal on line 36 removes the signal at the output of AND gate 47, thereby coupling the PROM to the bus 25. In this manner, an externally applied address may be used to fetch an instruction from the PROM 12, and the instruction so fetched may be examined (externally) on the bus 25. This mode of operation allows the PROM to be tested.

Thus, with the circuitry of FIG. 2, the program counter may be used to fetch instructions from PROM 12, and when the capacity of the PROM 12 is exceeded, automatically fetch instructions from external storage means. Moreover, the same circuitry permits separate testing of either the PROM or the CPU and RAM.

Referring now to FIG. 3, the RAM 14 of FIG. 1 is again illustrated with its read/write buffers coupled to the RAM input/output bus 83. This eight-line bus is coupled to a switching means 70, also six lines of this bus (identified as bus 82) are coupled to the multiplexer 74.

The main bidirectional data bus 25 of the computer is coupled to the switching means 70, thereby allowing data on the bus 25 to be written into the RAM 14, and data in the RAM 14 to be read onto the bus 25. By way of example, data from the ALU 91 may be written into RAM 14, or visa-versa.

The RAM 14 receives an address from the RAM address register 76. This six-bit address is coupled to the decoders of the RAM for purposes of selecting one of the sixty-four eight-bit registers $R_0-R_{63}$. The input to the RAM address register 76 is the output of the multiplexer 74. The multiplexer which receives a switching signal from the instruction decoder, selects one of three buses, and couples the signals on that bus into the RAM address register 76. The multiplexer selects signals on one of the 6 line buses 80, 81 or 82.

Line 87 of bus 81 which is coupled to the instruction decoder, provides the least significant bit of a RAM address. This bit selectively shifts the address by one, to allow a twelve bit address from the program counter to be stored in two consecutive registers within the RAM 14. A three-bit stack pointer register 72 which is coupled to the bus 25, by lines 85, provides two-bits of address signal on lines 88, and another bit of address signal for line 89. The signal on line 89 is inverted and coupled to line 90. The last line of bus 81 which line carries the most significant bit of the address, is coupled to ground, thereby providing a binary zero.

The third input bus to the multiplexer 74, bus 80, includes three lines 92 from the main bus 25, and two lines 86, both of which contain either a binary zero, or a binary one. The line carrying the most significant bit of bus 80 is coupled to ground to provide a binary zero. The lines 86 are coupled to a flip-flop 78 which flip-flop is controlled by the instruction decoder.

The switching means 70, the stack pointer register 72, flip-flop 78, multiplexer 74, register 76 and ALU 91 may be known MOS circuits.

As previously mentioned, registers $R_0$ and $R_1$ of RAM 14 may be used for indirectly accessing any of the other registers within the RAM. Assume that an address has been stored within either of these registers. This address may be communicated to register 76, via buses 83 and 82, and then to the RAM decoder through multiplexer 74 and register 76. In this manner, any register within the RAM may be accessed with an address stored within the RAM.

To improve the computer code efficiency, eight registers, $R_0-R_7$, are directly addressable. The signals required to select either of these eight registers are transmitted from the bus 25 on lines 92. The signals on these three lines are the three least significant bits of a RAM address. Assume, however, that all of the eight, directly addressable, registers are storing information, and that additional information is to be stored within the RAM. When this occurs, the instruction decoder provides a signal to flip-flop 78, causing binary ones to be applied to lines 86. These signals on lines 86 which are the fourth and fifth bits of the sixth-bit address, add twenty-four to the address. Thus, if the flip-flop 78 has been set and the address on the main bus 25 selects $R_0$, the data communicated to the RAM (on the RAM bus 83) will be stored in register $R_{24}$. Similarly, if the address on bus 25 selects register $R_8$, and the flip-flop 78 has been set, the data communicated to the RAM will be stored in register $R_{31}$. Thus, while only three-bits are utilized to directly address eight registers, through use of the flip-flop 78 and the lines 86, sixteen registers are, in effect, directly addressable.

The three lines 85 provide an address for the storage of the contents of the program counter. As mentioned, the high/low line 87 assures that the first eight-bits of the address are stored in one register, and that the remainder of the address is stored in an adjacent register. The signals on lines 89 and 90 cause the addresses on bus 81 to select registers $R_8$ through $R_{23}$. However, since all the registers in the RAM are indirectly addressable, registers $R_8$ through $R_{23}$ may be used for other storage where eight levels of nesting are not required.

Referring to FIG. 4, the third state level detector 33, in its presently preferred embodiment, comprises a pair of transistors 120 and 121 coupled in series. Transistor 120 has its drain terminal and gate coupled to the input line 19, and its source terminal coupled to the output of the detector, line 51. Transistor 121 is coupled between the output line 51 and ground. The gate of transistor 121 is coupled to the source of the $V_{CC}$ potential. The channel length of transistor 120 is approximately five times longer than the channel length of transistor 121, hence transistor 120 has substantially more resistance when conducting than transistor 121. When a potential of five volts (EA = 1) is applied to line 19, both transistors 120 and 121 conduct, however, the output on line 51 is substantially less than one volt. Thus, for purposes of the circuit of FIG. 2, this potential is not sufficient to operate as a high level input to the gates or inverter. When the third state voltage of twenty-five volts is applied to line 19, transistor 121 becomes heavily saturated and is overridden by transistor 120, causing line 51 to rise to a potential of approximately ten volts. This potential, on line 51 of FIG. 2, is a high level signal for the gates and inverter.

As previously mentioned the buses 15 and 17 of FIG. 1 are "quasi" bidirectional, these buses appear to be bidirectional from an external standpoint. However, each line of these buses includes a separate input line and output line between the buffer and the remainder of the computer. This buffer permits buffered outputs, and also allows external inputs to be applied to input/output ports.

Figure 5:
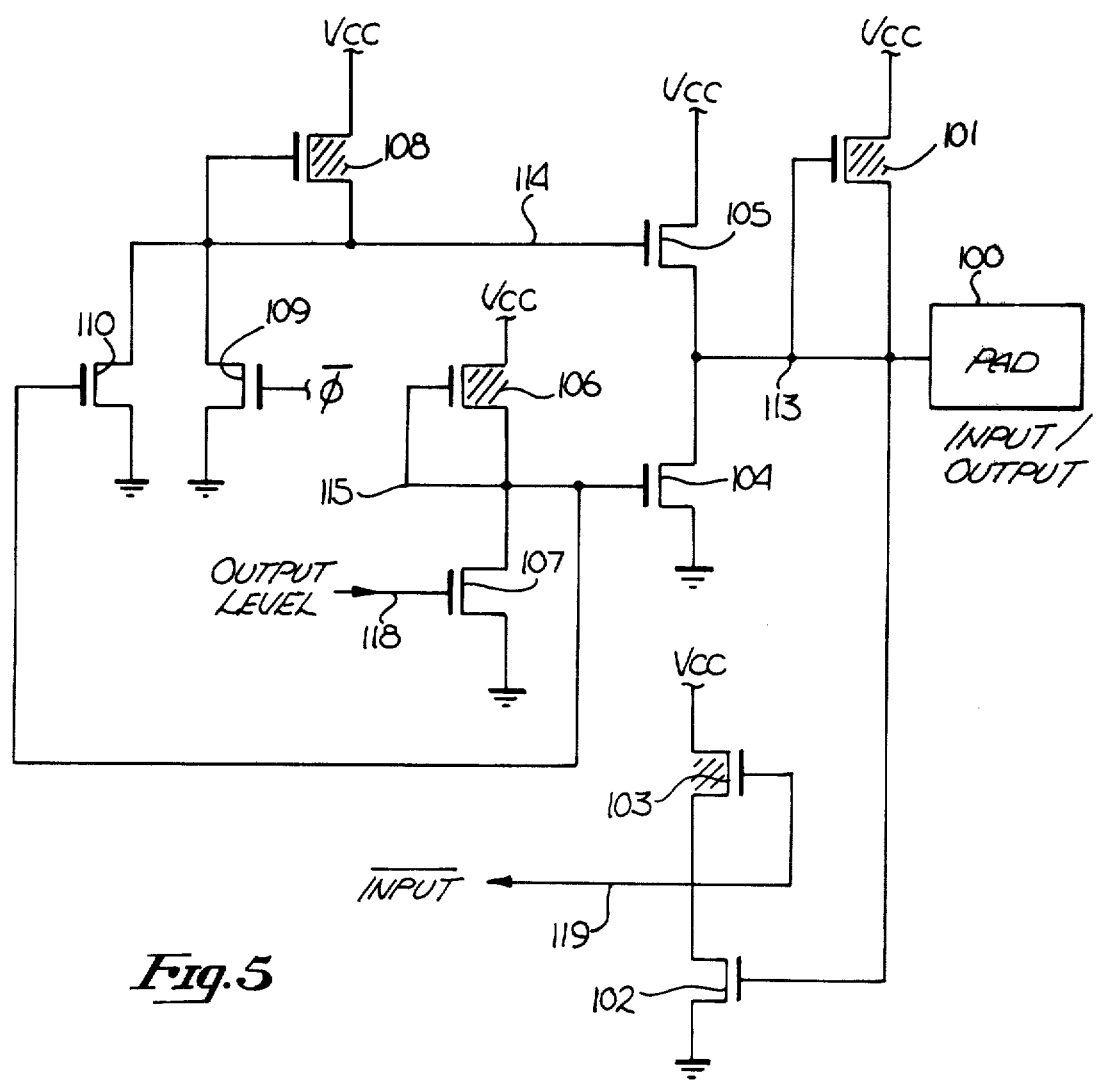
FIG. 5 is a circuit diagram of a buffer employed on the "quasi" bidirectional data lines of the computer.

Referring now to FIG. 5, each port includes a pad 100, an input line to the buffer (output from the computer), such as line 118, and an output line from the buffer (input to the computer), such as line 119. The signal on line 119 is the complement of the input signal applied to the pad 100. The input pad 100 is coupled to a node 113, which node is coupled to $V_{CC}$ through a depletion mode transistor 101. The resistance of this transistor is relatively high, and this transistor is used to maintain node 113 at the $V_{CC}$ potential once the node is charged through pull-up transistor 105. The gate of transistor 105 is coupled to node 114; this node is coupled to $V_{CC}$ through a depletion mode transistor 108, and to ground through parallel transistors 109 and 110. Transistor 109 has its gate coupled to the source of the $\phi$ signal, while transistor 110 has its gate coupled to node 115. Node 113 is pulled-down through transistor 104; the gate of transistor 104 is common with node 115. Node 115 is coupled to the $V_{CC}$ potential through a depletion mode transistor 106, and to ground through transistor 107. Transistors 104 and 105 are relatively large, hence have low resistance when compared to transistor 101.

Assume that a high level signal (i.e. five volts) is present on line 118, indicating that a binary one is to be written onto pad 100. During buffer operation once a high level signal is applied to line 118, the signal remains on this line until a binary zero is to be communicated to pad 100. This level signal causes the transistor 107 to conduct, bringing node 115 low, in turn, preventing device 110 from conducting. At the beginning of any buffer cycle the computer post control means brings the $\phi$ signal low, hence transistor 109 does not conduct for these conditions. Since neither transistors 109 nor 110 are conducting, node 114 is pulled to the $V_{CC}$ through the transistor 108. This causes transistor 105 to conduct, thereby charging node 113. When the $\phi$ signal again becomes positive, node 114 is pulled towards ground potential through transistor 109, and thus transistor 105 ceases to conduct. However, node 113 is maintained at $V_{CC}$ by the transistor 101. As mentioned, transistor 105 has a relatively low resistance, and thus, quickly, pulls the output node 113 towards $v_{CC}$. Thus, the output port serves as a true high level latched output, or as a pull-up resistor for an external device. This permits greater flexibility in coupling the computer to external circuits.

When a binary zero or low level signal is applied to line 118, transistor 107 does not conduct, and hence node 115 is maintained at the $V_{CC}$ potential by the transistor 106. This causes transistor 104 to conduct, and pulls node 113 towards ground potential. Since node 115 is at a $V_{CC}$, transistor 110 conducts preventing the pull-up transistor 105 from conducting.

Assume that a binary one has been previously written onto node 113 and pad 100 and that a binary zero is to be externally applied to the pad 100. Note that prior to this time since node 113 is at $V_{CC}$, transistor 102 is conducting, coupling line 119 to ground. When the binary zero is applied to pad 100, by way of example, from a TTL circuit, this external circuit is readily capable of over-riding the small sustaining current provided through the transistor 101, and thus, quickly discharges node 113. When this occurs, the depletion mode transistor 103 pulls line 119 to the $V_{CC}$ potential providing the appropriate signal on line 119. At the beginning of each buffer cycle when data is to be accepted from external sources, line 118 is brought high by the port control means. This enables a binary one to be externally applied to pad 100 when this pad has previously been latched to ground through transistor 104.

Figure 6:
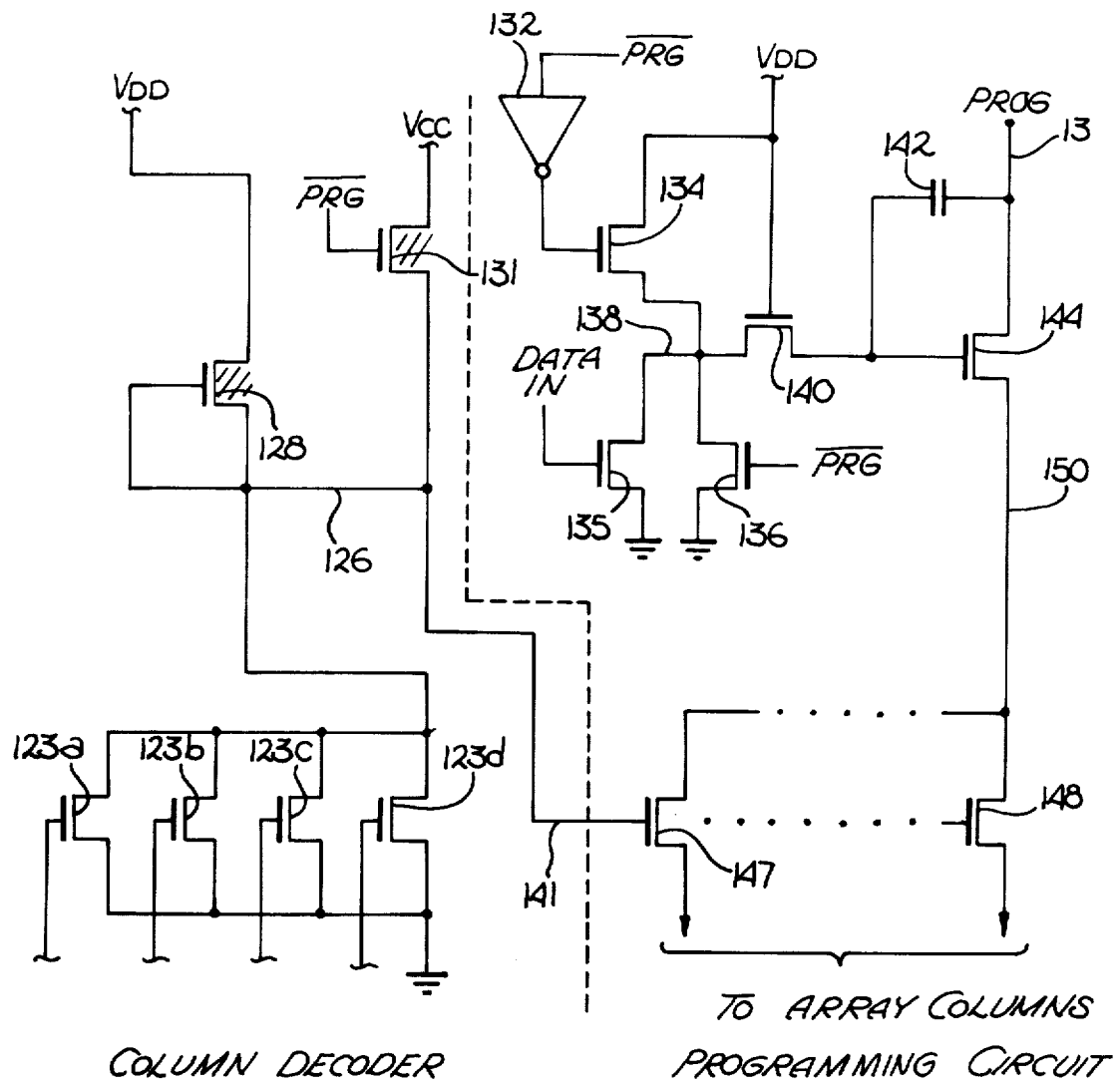
FIG. 6 is a circuit diagram of a column decoder and programming circuit employed for programming the PROM; and, FIG. 7 is a circuit diagram of a row decoder.

Referring to FIG. 6 a single column decoder is illustrated which decoder is coupled to a programming circuit by line 141. A plurality of such column decoders are utilized, each of which are coupled to the programming circuit shown in FIG. 6; for example, another column decoder would be coupled to the gate of the column select transistor 148. The programming circuit couples the programming pulse (PROG) on line 13 to the selected column, through a column select transistor, such as transistors 147 or 148.

The column decoder transistors 123a through 123d are coupled between node 126 and ground. The gates of these transistors are coupled to receive the input address in an ordinary manner. Thus, if the decoder of FIG. 6 is selected, transistors 123a through 123d, inclusive, do not conduct. Node 126 is coupled to the source of the $V_{DD}$ potential through a depletion mode transistor 128. The gate of transistor 128 is also coupled to node 126. Node 126 is coupled to the source of the $V_{CC}$ potential through a depletion mode transistor 131. Transistor 131 has its gate coupled to the source of the $\overline{PRG}$ signal.

In the programming circuit, the programming pulse (line 13) is coupled to node 150 (the drains of transistors 147 and 148) through transistor 144. The gate of transistor 144 is coupled to line 13 through a bootstrap capacitor 142. This gate is also coupled to node 138 through transistor 140. Node 138 is coupled through a pull-up transistor 134 to $V_{DD}$. The gate of transistor 134 is coupled to the source of the $\overline{PRG}$ signal through inverter 132. Two parallel pull-down transistors 135 and 136 couple node 138 to ground. The data-in signal is applied to the gate of transistor 135; the gate of transistor 136 is coupled to receive the $\overline{PRG}$ signal.

During the programming mode the potential $V_{DD}$ is raised to approximately twenty-five volts. This rise in $V_{DD}$ is detected by a circuit such as is shown in FIG. 4, with line 19 coupled to $V_{DD}$. The output from this detection circuit is used to generate the $\overline{PRG}$ signal.

During programming the twenty volt pulse applied to line 13 must be transmitted to the column lines, through a column select transistor, to the drain of the selected cell. Due to the body effect inherent in the presently preferred embodiment, the gate of the column select transistor must be raised to approximately twenty-five volts to transmit this programming pulse. This potential is obtained from the depletion mode transistor 128 is the decoder is selected.

During programming, node 138 is coupled to $V_{DD}$ through transistor 134. The output of inverter is equal to approximately $V_{DD}$ during programming. If the data-in is low, node 138 remains charged. When the programming pulse is applied, the gate of transistor 144 is bootstrapped, thereby transmitting the entire magnitude of the pulse to node 150. Transistor 140 allows the gate of transistor 144 to rise in potential above $V_{DD}$, and provides protection against transistor breakdown. If a binary one is applied to transistor 135, node 138 and the gate of transistor 144 would be substantially at ground potential, thereby preventing the positive pulse from being transferred from line 13 to node 150.

The positive pulse on line 13, when coupled to a column line causes charge to be injected onto the floating gate of the selected PROM cell. This causes the cell to have a higher threshold potential, for the n-channel cells employed.

Figure 7:
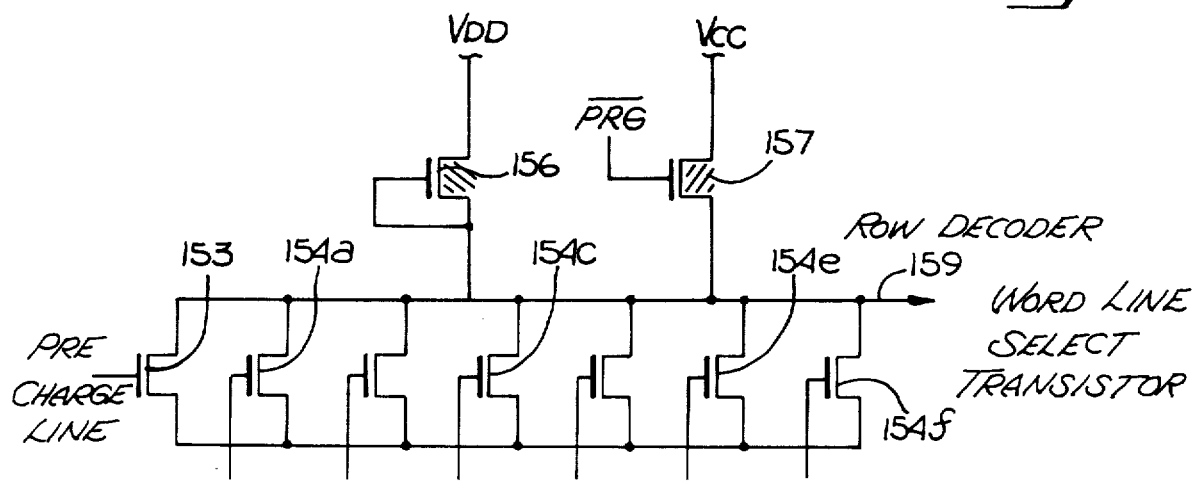

In the row decoder of FIG. 7, the node 159 is coupled to ground through a plurality of row decoder transistors 154a through 154f. Node 159 is also coupled to a word-line select transistor; similarly, a plurality of other row decoders are coupled to other word-line select transistors. These transistors are used to couple the selected word line (the source terminals of the cells) to ground during programming. Node 159 is coupled to $V_{CC}$ through a depletion mode transistor 157; the gate of this transistor is coupled to the source of the $\overline{PRG}$ signal. Node 159 is also coupled to the source of the $V_{DD}$ potential through a depletion mode transistor 156. Transistor 153 couples node 159 to ground for discharging this node to prevent premature selection of a word line.

During reading (not programming) line 159 is brought to $V_{CC}$ through the depletion mode transistor 157, provided that none of the decoding transistors 154a through 154f are conducting. During programming, transistor 157 is not conducting, hence node 159 is decoupled from $V_{CC}$. When the $V_{DD}$ potential rises to twenty-five volts, node 159 is pulled to this potential if the decoding transistors 154a through 154f are not conducting. The decoder is selected under these conditions. Transistor 156 may have a relatively high resistance since the time required to charge node 159 during programming is not crucial.

Thus, a digital computer has been disclosed which is totally incorporated on a single substrate. The substrate includes the CPU, a RAM, which is used for data storage within the computer, and a PROM, for storing the computer program, which may be erased and reprogrammed.

We claim:

1. An MOS digital computer comprising, on a single silicon substrate:
   a bidirectional data bus, said bus having terminals for coupling to external circuit means;
   a random-access memory (RAM) coupled to said data bus;
   a central processing unit (CPU) for performing arithmetic functions and for controlling the operation of said computer, said CPU coupled to said data bus and to said RAM;
   a read-only memory (ROM) for storing bytes of program, said ROM coupled to said data bus and to said CPU;
   said CPU including a program counter means, coupled to said ROM and said data bus for providing address signals to said ROM when said counter means contains a count which is less than a predetermined count, and for providing address signals to external memory when said counter means contains a count which exceeds said predetermined count;
   input detection means for receiving first and second externally applied predetermined signals for testing of said computer and for providing control signals to said program counter means and said ROM, said control signals for causing coupling of instructions from such external memory to said data bus independent of the count contained within said counter means when said first predetermined signal is received by said input detection means, and for causing said ROM to be coupled to said data bus such that said program stored in said ROM may be externally examined when said second predetermined signal is received by said input detection means;
   whereby the program storage capacity of said computer may be expanded by use of external memory which is automatically addressed by signals from said program counter means, and whereby said ROM and CPU may be separately tested.

2. The computer defined in claim 1 wherein said ROM is a programmable read-only memory (PROM).

3. The computer defined by claim 1 wherein said predetermined count approximately equals the maximum number of bytes which may be stored in said ROM.

4. The computer defined by claim 3 wherein said input detection means comprises a voltage level detection means for detecting three logic states on a single line.

5. The computer defined by claim 1 wherein said computer is fabricated entirely of n-channel devices.

6. The computer defined by claim 5 wherein said n-channel devices include polycrystalline silicon gates.

7. An MOS digital computer comprising, on a single substrate:
   a data bus;
   a read-only memory (ROM) for storing bytes of program storage, coupled to said data bus;
   a program counter for addressing said ROM, coupled to said ROM and to said data bus;
   a central processing unit (CPU) for interpreting instructions from said ROM and for executing said instructions, said CPU including an arithmetic logic means for performing arithmetic operations, said CPU being coupled to said data bus;
   a random-access memory (RAM) for storing digital signals coupled to said data bus;
   said computer including a RAM address register coupled to said RAM, said RAM address register receiving an input address from a multiplexing means, said multiplexing means coupled to select a first address bus, or a second address bus, said first address bus being coupled to receive an address corresponding to a location in said RAM from said data bus, said first address bus also being coupled to circuit means which selectively provides predetermined signals to said first address bus to selectively shift said RAM location;
   said second address bus coupled to a stack pointer register for providing address signals for locations in said RAM for storage of the contents of said program counter, said stack pointer register automatically incrementing or decrementing said address signals for locations in said RAM for said contents of said program counter;
   said computer including a third address bus coupled to said multiplexing means and to said RAM such that an address stored in said ROM may be used to select a location in said RAM;
   whereby directly addressable locations in said RAM may be addressed when said locations are storing data since said circuit means causes data to be stored in other locations and whereby said RAM is used to store said contents of said program counter with said stack pointer register automatically providing address signals.

8. The computer defined by claim 7 wherein said ROM is a programmable read-only memory.

9. The computer defined by claim 7 wherein said circuit means includes a bistable circuit for providing said location, said bistable circuit coupled to said first address bus.

10. The computer defined by claim 9 wherein said stack pointer register includes means for adding a binary one to the address on said second address bus whereby said contents of said program counter may be stored in adjacent locations within said RAM.

11. The computer defined by claim 10 wherein said RAM comprises a static RAM.

12. The computer defined by claim 10 wherein said computer is fabricated entirely of n-channel devices.

13. The computer defined by claim 12 wherein said n-channel devices include polycrystalline silicon gates.

* * * * *

UNITED STATES PATENT AND TRADEMARK OFFICE
CERTIFICATE OF CORRECTION

PATENT NO. : 4,153,933
DATED : May 8, 1979
INVENTOR(S) : Henry M. Blume, Jr. et al.

It is certified that error appears in the above-identified patent and that said Letters Patent are hereby corrected as shown below:

| COLUMN | LINE | DESCRIPTION |
|---|---|---|
| 3 | 18 | Insert the word --for-- between the words "only" and "synchronization" |
| 3 | 26 | Delete the word "includes" and insert in its place the word --include-- |
| 4 | 27 | Delete the comma between the words "copending" and "application" |
| 10 | 34 | Delete the word "is" following "128" and insert in its place the word --if-- |
| 12 | 41 | Delete the word "ROM" and insert in its place the word --RAM-- |

Signed and Sealed this

Fourteenth Day of August 1979

[SEAL]

Attest:

Attesting Officer

LUTRELLE F. PARKER
*Acting Commissioner of Patents and Trademarks*